United States Patent [19]

Herman

[11] 3,899,739

[45] Aug. 12, 1975

[54] DECODE SQUELCH CIRCUIT FOR A CONTINUOUS TONE CONTROL RADIO RECEIVER

[75] Inventor: Arthur L. Herman, Lynchburg, Va.

[73] Assignee: General Electric Company, N.Y.

[22] Filed: Sept. 4, 1973

[21] Appl. No.: 393,807

[52] U.S. Cl. .................................. 325/319; 325/478

[51] Int. Cl. ............................................. H04b 1/10

[58] Field of Search ....... 325/55, 64, 319, 392, 466, 325/478, 480; 330/51; 179/1 SW

[56] References Cited

UNITED STATES PATENTS 3,325,738 6/1967 Busby et al. .................... 325/478 X

*Primary Examiner*—Benedict V. Safourek

[57] ABSTRACT

In a known continuous tone control radio system, one or more selected radio receivers are rendered operable (or unsquelched) by the transmission of a continuous tone of selected frequency along with the other information in the radio transmission. A decode squelch circuit is provided to respond to this tone. This decode squelch circuit has a tone threshold that can be reproduced in large quantities, a sharp tone frequency response, and a tone threshold that is more sensitive after a tone is received.

3 Claims, 3 Drawing Figures

DECODE SQUELCH CIRCUIT FOR A CONTINUOUS TONE CONTROL RADIO RECEIVER

BACKGROUND OF THE INVENTION

My invention relates to a continuous tone control radio system, and particularly to an improved decode squelch circuit for radio receivers used in such a system.

In some radio communication systems, it may be desirable or necessary that some transmissions on a particular radio carrier frequency be heard only by a selected receiver or receivers, and that some other transmissions on the same particular radio carrier frequency be heard only by a different selected receiver or receivers. This has been achieved by the transmission of an audio tone of selected frequency along with but outside the range of the information frequencies. The particular frequency of the audio tone is used to render selected radio receivers operative (i.e. unsquelched) so that only those receivers sensitive to the frequency of the audio tone provide the information, and so that all other radio receivers remain inoperative (i.e. squelched). Thus, more effective use can be made of a single radio carrier frequency, and some privacy can still be provided.

Accordingly, a primary object of my invention is to provide a new and improved decode squelch circuit for a radio receiver in a continuous tone control radio system.

While previous squelch circuits have been provided in radio receivers for a continuous tone control radio system, such squelch circuits have not provided the threshold sensitivity which is desirable or necessary for such radio receivers.

Accordingly, another object of my invention is to provide a novel squelch circuit that has improved threshold sensitivity so as to make a radio receiver particularly useful and desirable in a continuous tone control radio system.

SUMMARY OF THE INVENTION

Briefly, these and other objects are achieved in accordance with my invention by a decode squelch circuit (in addition to the noise squelch circuit already provided in a radio receiver) that is provided with the selected audio tone at two inputs. The tone at one input is shifted by 180 degrees with respect to the tone at the other input. When the tone is present at the two inputs with a 180° phase relation, my squelch circuit increases its amplitude sensitivity to the tone to lock the circuit to the responsive condition. My circuit also provides an unsquelch signal that permits the receiver audio circuit to produce the received information. Upon termination of the information transmission, the tone continues for a short time but at an opposite phase. My circuit responds to this phase change by decreasing its amplitude sensitivity to amplitude, and produces a squelch signal that prevents the receiver audio circuit from producing an output, thus eliminating reception of noise (i.e. eliminating the squelch tail). The squelch signal is produced by my circuit for a time period long enough to insure that the radio receiver remains squelched until the noise squelch circuit takes over and keeps the receiver squelched until another transmission is received.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

Figure 1:
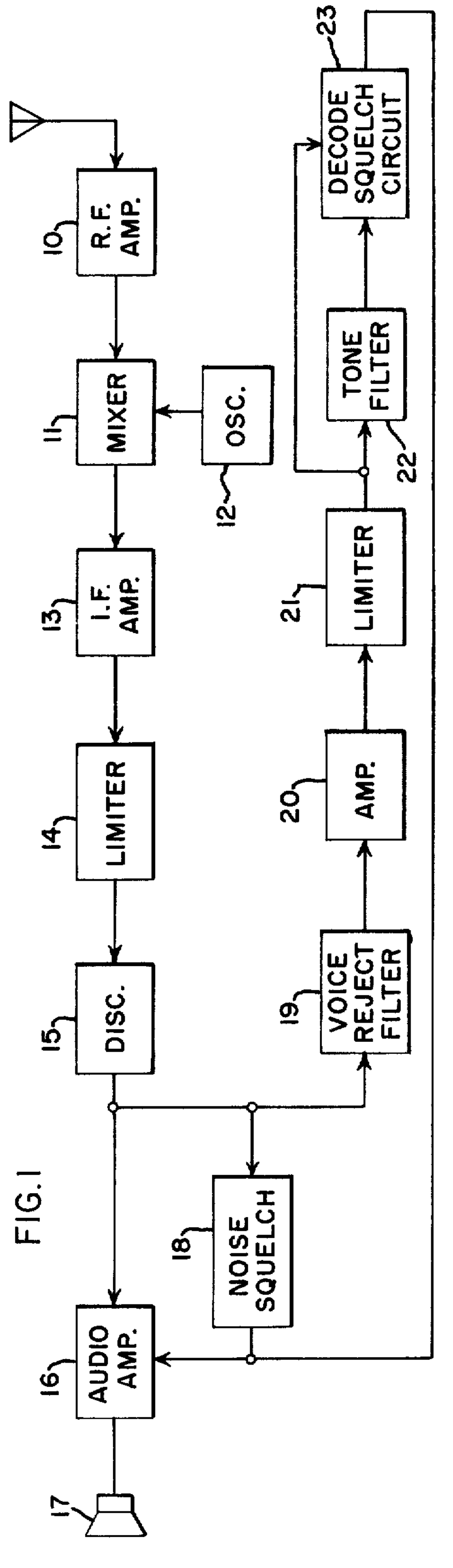
FIG. 1 shows a block diagram of a conventional radio receiver provided with the improved decode squelch circuit in accordance with my invention.

FIG. 1 shows a block diagram of a frequency modulation radio receiver provided with the decode squelch circuit in accordance with my invention. I have selected a frequency modulation receiver because such receivers are typically used with a continuous tone control radio system. However, it is to be understood that it may be possible to use my invention with other types of receivers. The receiver of FIG. 1 includes an antenna for receiving the frequency modulated signals. These signals are supplied to a radio frequency (RF) amplifier 10, and the amplified signals are supplied to a mixer 11. The mixer 11 receives signals from an oscillator 12 to produce intermediate (IF) frequency signals which are amplified in an IF amplifier 13 and supplied to an amplitude limiter 14. The amplitude limited signals are applied to a detector or discriminator 15. The detected signals are supplied to an audio amplifier 16 and are utilized in any suitable way, such as by a loudspeaker 17. Where, as contemplated here, the information signals are also provided with a continuous tone during and for a short period after the information signals are terminated, the audio amplifier 16 includes a tone reject filter which blocks the tone frequencies, generally below 250 Hertz, so they will not be supplied to the loudspeaker 17. The discriminator 15 also provides the audio signals to a noise squelch circuit 18. The noise squelch circuit 18 typically includes a noise filter network which has a passband above the audio frequency band, and produces a squelch signal whenever the noise level received rises above a selected threshold because of the absence of an information signal. This squelch signal is applied to an appropriate point in the audio amplifier 16 to squelch or mute the audio amplifier 16 in response to noise. However, when a carrier signal with information is received, the noise squelch circuit 18 produces an unsquelch signal which opens the audio amplifier 16 so that information signals can be received. The discriminator 15 also supplies the audio signals to a voice reject filter 19 which is a low pass filter that rejects the voice frequencies (generally above the assumed 250 Hertz), and passes only the low frequency continuous tone. The tone frequencies are amplified in an amplifier 20, amplitude limited in a limiter 21, and supplied to a tone filter circuit 22. The tone filter 22 is a highly selective or narrow band filter centered about the particular tone frequency to which the receiver is to be sensitive and rendered operable in response to the particular tone frequency. Such a tone filter may have a narrow passband (such as plus or minus 0.5%, which would amount to several cycles) so that a large number of tones of different frequencies can be supplied in the band below 250 Hertz. The circuit as described thus far is known in the art, and according to my understanding, signals from the tone filter 22 have previously been applied to the audio amplifier 16 to control the audio amplifier 16 in addition to or independently of signals from the noise squelch circuit 18.

In a continuous tone control radio system, it is desirable or necessary, from either the standpoint of privacy or frequency conservation, to make selected radio receivers responsive only to certain transmissions on a given carrier frequency, although other receivers in the system may receive that same carrier frequency. This is achieved by the use of a continuous tone transmitted along with the information signals, but typically at frequencies below the information signals. In the case of the system providing radio telephone communication, the continuous tone transmitted is at a selected frequency generally in the range between 67 and 250 Hertz. The particular tone frequence transmitted renders only selected radio receivers operative, since such selected receivers are arranged, because of the characteristics of their tone filter, to be responsive to that particular frequency. Upon reception of tone of the proper frequency, the audio amplifier is unsquelched so that information (usually voice) signals are received. After the voice signals are terminated, the tone continues to be transmitted for a short length of time but at an opposite phase (i.e. shifted 180°) with respect to the tone transmitted during the time of transmission of information signals. This shift in phase is used in known systems to squelch the audio amplifier as quickly as possible, so that no signals are heard in the loudspeaker. Subsequently, the tone and radio frequency carrier are removed, and the noise squelch circuit takes over and keeps the radio receiver squelched until another transmission. While such known circuits have performed reasonably well, I have found that the threshold level of the tone filter and associated circuits may vary considerably from receiver to receiver. If the threshold level is too high, the receiver will not be unsquelched, even though a continuous tone is being transmitted and received. Accordingly, transmissions will be lost. Or, if the threshold level is too low, the receiver may remain unsquelched even though the transmission ends, so that noise (sometimes called a squelch tail) is received. It is, therefore, a primary object of my invention to overcome these disadvantages or undesirable features.

In accordance with my invention, I provide a decode squelch circuit 23 for the receiver of FIG. 1. This squelch circuit 23 is provided with two signal inputs, one taken from the limiter 21, and the other taken from the tone filter 22. If these two signals have the proper phase relation, my squelch circuit 23 produces a signal which renders the audio amplifier 16 operative or unsquelched. In this regard, it should be noted that an unsquelch signal from my squelch circuit 23 and an unsquelch signal from the previously known noise squelch circuit 18 are both required to unsquelch the audio amplifier 16. Either one of the squelch signals by itself can squelch the audio amplifier 16.

Figure 2:
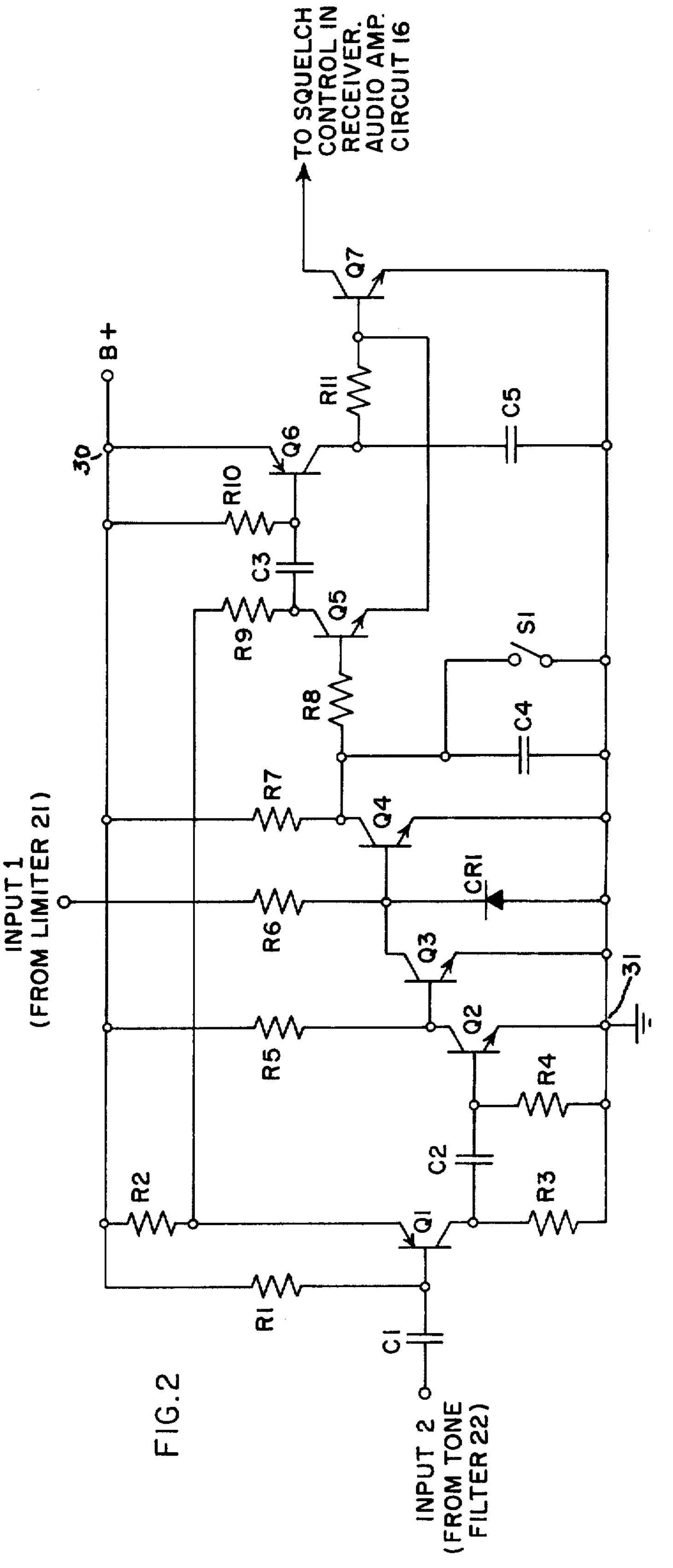
FIG. 2 shows an electrical circuit diagram of my decode squelch circuit of FIG. 1.

FIG. 2 shows an electrical circuit diagram of my squelch circuit 24 shown in FIG. 1. The squelch circuit of FIG. 2 is provided with an input 1 which is connected to the limiter 21 and with an input 2 which is connected to the tone filter 22. The signals applied to the input 1 are the signals passed by the voice reject filter 19, the amplifier 20, and the limiter 21. The signals applied to the input 2 pass through the filter 22 and are shifted so that they have the opposite phase (i.e. shifted 180°) with respect to the signals at the input 1. The squelch circuit of FIG. 2 is provided with a suitable source of direct current operating potential. This source has its positive terminal (indicated as B+) connected to a bus 30, and its negative terminal connected to a reference or ground bus 31. The input terminal 2 is connected through a capacitor C1 to a threshold level transistor Q1. The transistor Q1 is biased by the resistor R2 so that only negative-going signals which exceed a selected threshold level (i.e. are more negative) can cause the transistor Q1 to conduct. Signals are derived from the collector of the transistor Q1 and supplied to a transistor Q2. Signals are derived from the collector of the transistor Q2 and supplied to a transistor Q3. When signals cause the transistor Q1 to conduct, this conduction causes the transistor Q2 to conduct, and this in turn causes the transistor Q3 to turn off. When the transistor Q3 is turned off, positive-going signals at the input 1 may cause the transistor Q4 to turn on. Thus, signals at the input 1 may cause the transistor Q4 to conduct only when the transistor Q3 is turned off.

The collector of the transistor Q4 is provided with a capacitor C4 to ground, and this capacitor charges through a resistor R7 during the time that the transistor Q4 is turned off. When the transistor Q4 conducts, the capacitor C4 is discharged. The charge on the capacitor C4 is applied to the base of a transistor Q5 which has its collector connected through a resistor R9 and the resistor R2 to the positive bus 30. The emitter of the transistor Q5 is connected to the base of an output transistor Q7. In the absence of tone signals at the inputs 1 and 2, the transistor Q4 is turned off so that the capacitor C4 is charged. This turns the transistor Q5 on. When the transistor Q5 conducts, the transistor Q7 also conducts so that its output (derived at the collector) is at or near the ground or reference potential. This causes a squelch signal to be produced so that the audio amplifier 16 of FIG. 1 cannot produce information signals. Upon receipt of signals of the proper phase relation at the inputs 1 and 2, the transistor Q4 is repetitively turned on, as will be explained, so that the capacitor C4 can not charge sufficiently to cause the transistor Q5 to turn on. Hence, the transistor Q7 is turned off, and this produces an unsquelch or operative signal to the audio amplifier 16.

A transistor Q6 is controlled by conduction of the transistor Q5 to provide charge for a capacitor C5 which, when charged, keeps the transistor Q7 on for a sufficient length of time to make sure that the receiver remains squelched under the appropriate conditions which will be described.

Figure 3:
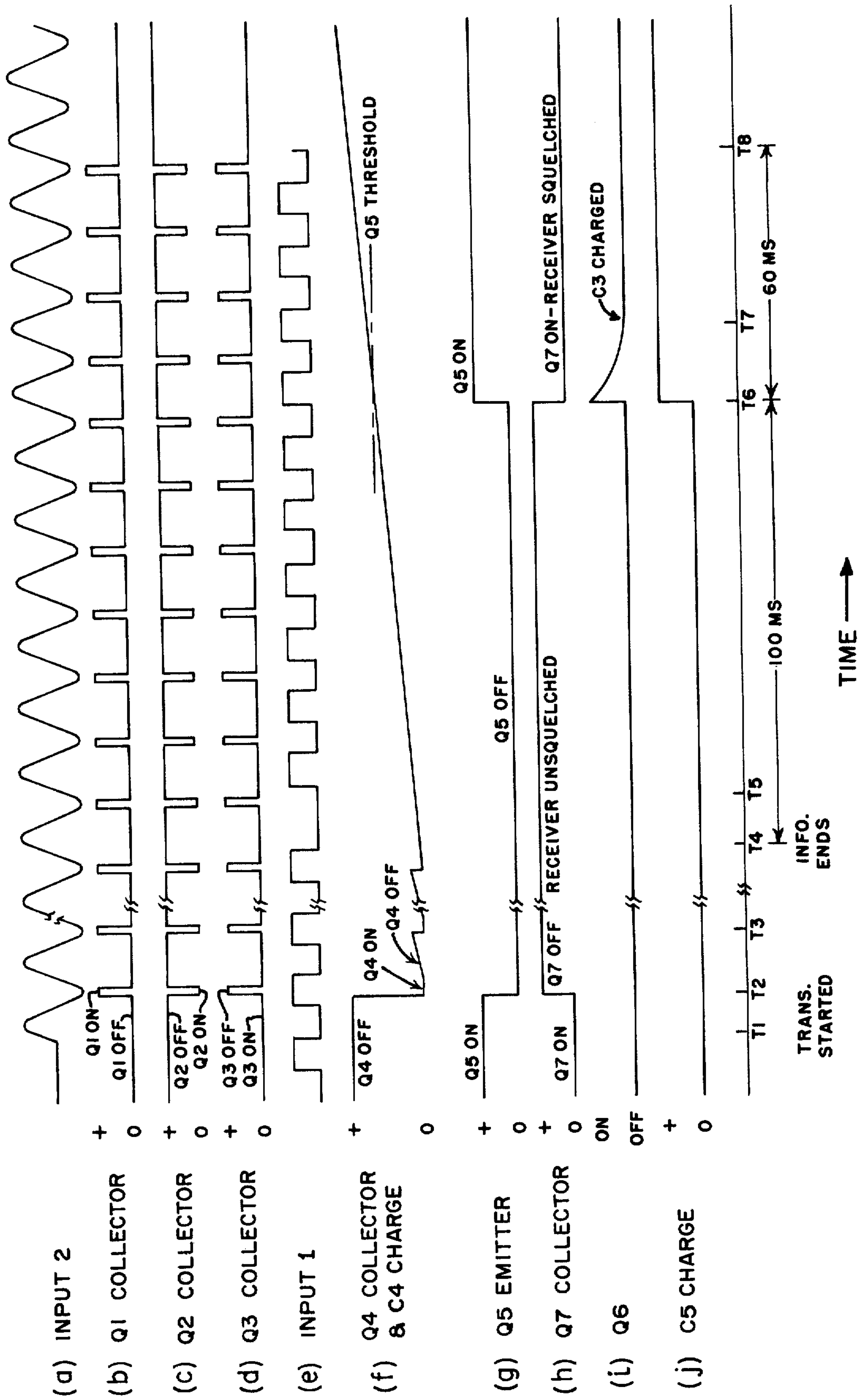
FIG. 3 shows wave forms illustrating the operation of the decode squelch circuit of my invention.

The operation of the circuit of FIG. 2 can be better understood with reference to FIG. 3, which shows wave forms taken at various points in the circuit of FIG. 2 along a common time axis. In FIG. 3, the wave forms (*a*) through (*j*) are taken from the circuit of FIG. 2 at the designated places. Prior to the time T1, it is assumed that no signals are being received. At the time T1, it is assumed that information signals and a tone of the proper frequency are received. The tone signals at the input 2 are shown in FIG. 3*a*, and the signals at the input 1 are shown in FIG. 3*e*. The signals at the input 1 will have been received for some time prior to the time T1 because of the inherent time delay in the tone filter 22 of FIG. 1. At the time T1, it will be noted that the signals at inputs 1 and 2 are in the proper opposite phase relation (i.e. 180° apart). At the first negative half cycle of the tone at the input 2 at the time T2, the transistor Q1 is turned on so that its collector swings positive as shown in FIG. 3b. This causes the transistor Q2 to also turn on so that its collector swings toward zero as shown in FIG. 3*c*. This causes the transistor Q3 to be turned off so that its collector swings positive as shown in FIG. 3*d*. With the transistor Q3 turned off, and with the tone at the input 1 at the proper phase relation (the tone should be positive), signals at the input 1 can cause the transistor Q4 to turn on. This is shown in the wave form of FIG. 3*f*. Any charge on the capacitor C4 is removed by conduction through the transistor Q4. Hence, the voltage at the collector of the transistor Q4 approaches zero, and this turns the transistor Q5 off as shown in FIG. 3*g*. Turn off of the transistor Q5 causes the transistor Q7 to be turned off also as shown in FIG. 3*h*, so that its collector goes from what I have arbitrarily designated a logic zero to a logic one. I have assumed that this logic one causes the receiver to be unsquelched, if a squelch signal is not produced by the noise squelch circuit. When the transistor Q5 is turned off by tone at the time T2, the reduction of current through the resistor R2 causes the emitter voltage of the transistor Q1 to increase so that the transistor Q1 is more sensitive to tone amplitude. That is, the transistor Q1 will remain on even though the signal at the input 2 is reduced in amplitude. Shortly after the time T2, and well before the time T3, the tone at the input 2 swings positive and the collectors of transistors Q1, Q2, Q3, Q4 return to the opposite condition again. With the transistor Q4 now off, the capacitor C4 can begin to charge, and does so until the time T3, when the transistor Q4 is turned on again. This discharges the capacitor C4 before it is sufficiently positive to turn the transistor Q5 on. Thus, the transistor Q5 remains turned off, and if an unsquelch signal is produced by the noise squelch circuit 18, the receiver remains unsquelched. This operation continues as long as information signals and a tone are transmitted, which may be for any length of time. I have assumed that transmission of information ends at the time T4. When this occurs, the transmitter causes the tone to reverse its phase by 180°. This is shown up immediately in the input 1, since the input 1 is not subject to delay. However, the input 2 wave form of FIG. 3*a* does show shown this phase reversal, since the filter 22 does not permit a change to appear at the input 2 for approximately 70 milliseconds following a change in phase. At the time T5 when the tone at the input 2 is negative, the input 1 is also negative. Hence, even though the transistor Q3 is turned off, the tone of the input 1 is negative so that the transistor Q4 cannot be turned on, and the capacitor C4 can continue to charge. At the time T6, the charge on the capacitor C4 reaches the threshold level for causing the transistor Q5 to be turned on. This time depends, of course, on the value of the capacitor C4 and its charging resistor R7. I have assumed that this time constant is approximately 100 milliseconds. At the time T6, the charge reaches a sufficient level so that the transistor Q5 is turned on. Conduction of the transistor Q5 causes the transistor Q7 to be turned on so that its output becomes a logic zero and the receiver becomes squelched, even though the noise squelch 18 of FIG. 1 may be producing an unsquelch signal.

At the time T6, and again with reference to FIG. 2, when the transistor Q5 is turned on, it draws its collector-emitter current through the resistor R2 in the emitter circuit of the transistor Q1. This lowers the voltage at the emitter of the transistor Q1 and decreases its sensitivity and phase response. That is, a wider amplitude swing (particularly in the negative-going direction) is required to turn the transistor Q1 on under this condition. Thus, the amplitude sensitivity of the transistor Q1 is decreased, so that the transistor Q1 is less likely to be turned on by a weak signal.

Again with respect to FIG. 3 at the time T6, when the transistor Q5 is turned on, its reduced collector voltage turned the transistor Q6 on for a sufficient length of time to charge the capacitor C5 as shown in FIG. 3j. The transistor Q6 remains on until the time T7 when the capacitor C3 is charged so as to raise the base voltage on the transistor Q6 and turn the transistor Q6 off. However, once the capacitor C5 is charged, its only discharge path is through the resistor R11 which, if large enough, maintains the base of the transistor Q7 sufficiently positive for a sufficient length of time (for example 250 milliseconds) and insures that the transistor Q7 remains on and the receiver remains squelched until the tone at the input 1 no longer appears following its delay. This insurance of the receiver remaining squelched thus gives the noise squelch circuit 18 sufficient time to regain its function after the carrier and tone are removed. Thus, the noise which would otherwise be heard at the end of the transmission is eliminated.

It will thus be seen that my invention provides a new and improved control circuit for continuous tone control radio systems. The amplitude threshold is primarily set by the emitter to base voltage of the transistor Q1, and this voltage is relatively constant because of the similarity obtainable with transistors. The threshold level determines precisely when the transistor Q3 is turned off, and when an unsquelch signal is produced. In addition, the threshold is varied as a function of received tone. Thus, erroneous and false operations are prevented, in addition to the fact that no noise is heard at the end of a transmission. While I have shown only one embodiment, persons skilled in the art will appreciate that modifications may be made. For example, various time constants or threshold levels may be used. And, a disabling switch S1 may be connected across the capacitor C4. When the switch S1 is closed, my circuit produces an unsquelch signal, regardless of whether tone is or is not applied. Therefore, these and other modifications come within the spirit of the invention and the scope of the claims.

What I claim as new and desire to secure by U.S. Letters Patent is:

1. In a radio receiver having means to be unsquelched in response to an unsquelch signal and to be squelched in response to a squelch signal, an improved decode squelch circuit comprising:

a. means adapted to be connected to said radio receiver for deriving a continuous tone therefrom that is transmitted over a system to said radio receiver;

b. first means connected to said deriving means for producing a first tone signal of a first phase;

c. second means connected to said deriving means for producing a second tone signal of a second phase that is shifted substantially 180 degrees with respect to said first phase;

d. a first transistor having input and output electrodes;

e. means connecting said first transistor input electrodes to said first means;

f. means connected to said first transistor input electrodes for preventing said first transistor from responding to said first tone signal;

g. a second transistor having input and output electrodes;

h. means connecting said second transistor input electrodes to said second means;

i. means connecting said output electrodes of said second transistor to said input electrodes of said first transistor for permitting said first transistor to respond to said first tone signal at said first input in response to said second tone signal at said second input;

j. a capacitor;

k. means connecting said capacitor to said output electrodes of said first transistor to charge said capacitor in response to said first transistor being prevented from responding to said first tone signal, and to discharge said capacitor in response to said first transistor being permitted to respond to said first tone signal;

l. an output transistor having input and output electrodes;

m. means connecting said input electrodes of said output transistor to said capacitor for causing said output transistor to produce a squelch signal in response to said capacitor being charged above a selected level and for causing said output transistor to produce an unsquelch signal in response to said capacitor being discharged below a selected level;

n. means connected between said output electrodes of said output transistor and said electrodes of said second transistor for causing said second transistor to respond to second tone signals of a lower magnitude in response to said output transistor producing an unsquelch signal;

o. and output means connected to said output electrodes of said output transistor for applying said squelch and unsquelch signals to said receiver.

2. The improved decode squelch circuit of claim 1, and further comprising:

a. a third transistor having input and output electrodes;

b. a second capacitor;

c. means connecting said second capacitor to said output electrodes of said third transistor;

d. means connecting said input electrodes of said third transistor to said output electrodes of said output transistor for charging said second capacitor in response to said output transistor producing said squelch signal;

e. and means connecting said second capacitor to said output means for maintaining said squelch signal for a selected length of time in response to the charge on said second capacitor.

3. The improved decode squelch circuit of claim 1, wherein said means for lowering said response magnitude of said second transistor comprises a resistive circuit connected between said output electrodes of said output transistor and one of said output electrodes of said second transistor.

* * * * *